United States Patent [19]

Plotnick

[11] Patent Number: 4,859,093

[45] Date of Patent: Aug. 22, 1989

[54] PIXEL PREHEAT SYSTEM FOR AN AUTOMATED THERMAL TRANSFER DEVICE

[75] Inventor: Michael A. Plotnick, Southampton, Pa.

[73] Assignee: Kroy Inc., Scottsdale, Ariz.

[21] Appl. No.: 170,756

[22] Filed: Mar. 21, 1988

[51] Int. Cl.[4] .......................... B41J 3/02; G01D 15/10

[52] U.S. Cl. ................................ 400/120; 346/76 PH; 219/216

[58] Field of Search ................................ 400/120, 126; 346/76 PH; 219/216

[56] References Cited

U.S. PATENT DOCUMENTS 4,674,895 6/1987 Tanaka et al. ...................... 400/121
4,699,531 10/1987 Ulinski et al. ...................... 400/120
4,724,446 2/1988 Hirahara ........................ 346/76 PH
4,758,966 7/1988 Brooks et al. ...................... 400/120

*Primary Examiner*—Eugene H. Eickholt
*Attorney, Agent, or Firm*—Dorsey & Whitney

[57] ABSTRACT

A pixel preheat system for a thermal transfer device in which a selected image is transferred from a strip of color carrying ribbon to a strip of image carrying tape achieves precise control of the temperature of the individual pixel heating elements in a thermal printhead by combining the pixel data values just printed with the pixel data values to be printed to generate a pixel preheat value whenever either of the pixel data values is off or white. The present invention maintains the temperature of the individual pixel heating elements closer to the transition temperature of the thermal transfer ribbon and uses fewer circuit components.

13 Claims, 5 Drawing Sheets

PIXEL PREHEAT SYSTEM FOR AN AUTOMATED THERMAL TRANSFER DEVICE

RELATED APPLICATIONS

This application is related to co-pending application entitled TAPE-RIBBON SUPPLY SYSTEM FOR A THERMAL TRANSFER DEVICE OR THE LIKE, filed in the United States Patent and Trademark Office on February 1, 1988 and identified by Ser. No. 151,103, to co-pending application entitled THERMAL TRANSFER DEVICE AND TAPE-RIBBON CARTRIDGE THEREFOR, filed in the United States Patent and Trademark Office on Feb. 1, 1988 and identified by Ser. No. 151,110, to co-pending application entitled THERMAL TRANSFER DEVICE AND TAPERIBBON CARTRIDGE EMBODYING A TAPE CUTOFF MECHANISM, filed in the United States Patent and Trademark Office on Feb. 1, 1988 and identified by Ser. No. 151,109, and to co-pending application entitled AN AUTOMATED THERMAL TRANSFER DEVICE AND CONTROL SYSTEM THEREFOR, filed in the United States Patent and Trademark Office on Mar. 18, 1988 and identified by Ser. No. 170,796.

TECHNICAL FIELD

The present invention relates generally to the field of printing apparatus or composing systems, and, more particularly, to an improved pixel preheat means for a printing apparatus or composing system of the type involving the use of a thermal process to transfer pixel images of a desired character or design from a color carrying ribbon onto an image carrying tape as a result of the localized application of heat and pressure at each pixel. This type of printing apparatus of composing system has particular application in the printing of relatively large characters or sequences of characters of varying type sizes and fonts for use in preparing lettering for engineering drawings, flip charts, overhead transparencies, posters, advertising brochures, identification labels and the like. The characters printed by this type of printing apparatus or system are generally larger than characters produced by most typewriters or the like and include a wide variety of type sizes and fonts for alphanumeric characters, along with any number of special characters or images such as symbols, logos and trademarks.

BACKGROUND ART

Tape lettering systems employing a dry lettering printing process that mechanically transfers an impression of a character on a rotatable type disc from a dry film ribbon to an image carrying tape by means of an impact means or pressure printing force are well known in the prior art, and are shown and described in U.S. Pat. Nos. 2,834,507; 4,243,333; and 4,402,619. An automated tape lettering machine employing this process is shown and described in U.S. Pat. No. 4,462,708. While each of these prior art machines is capable of generating high quality printing and lettering results, there is a need for a high speed tape printing apparatus capable of generating high quality characters without the limitations imposed by using an impact or pressure lettering device.

Thermal transfer printing devices also exist in which an image of a desired character is formed on a strip of image carrying tape by transferring ink or other color from a color carrying ribbon to the tape as a result of the localized application of heat and a small amount of pressure. A typical thermal transfer device of this type is described in U.S. Pat. No. 4,666,319. Another thermal transfer device presently available employs a thermal print head for transferring images from a strip of ribbon to a strip of tape and has a cooperating tape-ribbon cartridge for providing a supply of tape and ribbon to the device. While such devices are useful for printing smaller point size characters represented in a dot-matrix array font format, the control systems required by such devices are not capable of handling the precision and accuracy required by a high speed tape printing apparatus capable of generating high quality characters, particularly characters of larger point sizes.

One of the difficulties in implementing a control system for a high speed, high quality thermal transfer tape printing apparatus is controlling the temperature of the individual pixel heating elements in the thermal printhead. Prior art systems for controlling the temperature of the pixel heating elements in a thermal printheads have only been applied to smaller print heads used in more conventional printing applications (e.g. 5×7, 24×1 dot matrix printheads), and have not been applied to a large thermal printhead (e.g., 256×1) with relatively small pixel heating elements of the type used in the thermal transfer tape printing apparatus contemplated by the present invention.

In U.S. Pat. No. 4,376,942, a preheat power is applied to the individual pixel heating elements only on the current state or value of the pixel. If the current pixel state is black or "on", then no preheat power is applied. If, on the other hand, the current pixel state is white or "off", a constant preheat power (of a reduced level) is applied for the entire duration of that pixel print time. While this method has the advantage of keeping the temperature of the individual pixel heating elements close to the threshold print temperature needed to effect a thermal transfer, thus minimizing the time needed for that individual pixel heating element to reach the threshold print temperature, it requires a large amount of power for a printhead with a large number of pixels. This results from the fact that during the operation of the device of the above '942 patent, each pixel heating element is constantly energized, or consumes some type of current (either a preheat or a print current), during the entire time of each print cycle. Further, the '942 device fails to compensate either for consecutive occurrences of the same pixel state, (i.e., three consecutive "print" cycles), or for long term application of the preheat power (i.e., several consecutive "no print" cycles). Further, the circuitry is quite complicated because two preheat voltage levels are required. All of these conditions may lead to an overheating of the entire printhead or of the individual pixel heating elements and result in a smearing of a pixel image on the tape or the creation of ghost or phantom images where no images are intended or desired.

In U.S. Pat. Nos. 4,415,907 and 4,560,993, hardware circuitry is added to the printhead circuitry to base the preheat power on a combination of the previous pixel state or value and the current pixel state or value. In the system of U.S. Pat. No. 4,560,993, the objective is to minimize the power consumption of the printhead by warming up or preheating the printhead with a preheat pulse only when (i) the current pixel state is to "print" and (ii) the previous pixel state was to "not print". Thus, in U.S. Pat. No. 4,560,993, energy is conserved by removing the pixel preheat if the previous pixel state was to "print" (or was black) and the current pixel state is also to "print" (or is black) and by removing the pixel preheat whenever the current pixel state is to "not print" (or is white). While combining the previous pixel state with the past pixel state increases the ability to reduce power consumption and the overheating of the printhead or individual pixels during continuous operation of the system, the systems taught by these prior art patents require extensive additional circuitry to implement, especially for larger size thermal printheads.

Each of these systems also suffers from the disadvantage of not being able to precisely maintain the temperature of the individual pixel heating elements close to, but just below, their threshold thermal transfer temperature. Maintaining the pixel heating elements just below this threshold level decreases both the amount of power and the time required to activate an individual pixel heating element. In addition, because the ribbon used in high quality thermal transfer tape printing apparatuses is usually some type of plastic based ribbon, the pixel images transferred from the ribbon to the tape are uniformly defined and can not smear or smudge into one another. Consequently, unlike the thermal printers and pixel preheat systems of the prior art, the uniformity of the pixel images created by the thermal transfer apparatus of the present invention are not separated by a blank space, but must be exactly abutting the adjacent column of pixel images. This requires an even more precise control of the temperatures of the pixel heating elements to enable the pixel heating elements to be turned on and turned off quickly and accurately in order to achieve high quality, high speed lettering results when using a thermal transfer tape printing apparatus of the type contemplated by the present invention.

Although the current pixel preheat systems for thermal transfer devices may be satisfactory for various uses and applications, they are limited in their application to large thermal printheads and do not provide sufficient control over the pixel heating element temperature to enable high quality characters to be printed on the tape at a high speed. Accordingly, there is a continuing need for improvements in the control systems associated with tape lettering printing apparatus, and, in particular, with an efficient pixel preheat system for such thermal transfer devices to allow for a more precise control of the temperature of the individual pixel heating elements in the printhead.

SUMMARY OF THE INVENTION

In accordance with the present invention, a thermal transfer device, and in particular a control system for such a device, is provided in which an image of a desired character is transferred from a strip of color carrying ribbon to a strip of image carrying tape. Generally, such a device includes an image transfer station defined by a printhead and a cylindrical platen. A rotary or other drive means is also provided for advancing the tape and ribbon from a tape-ribbon supply cartridge or the like past the image transfer station. The device may also include a tape-ribbon cartridge embodying an internal tape-cut mechanism, and an input module for entering, editing, storing and transmitting the selected characters or designs to be printed on the tape.

The pixel preheat system of the present invention controls the mechanisms for a set of pixel preheat values based on the pixels that define an image of a selected character or design to be printed. In a preferred embodiment of the invention, the pixel preheat system is comprised of a programmable data processing means for receiving print data and control codes representing the desired characters or designs to be printed and for controlling the generation of the pixel preheat values. The image transfer station is comprised of a printhead having at least one column of pixel heating elements and associated circuitry for driving the current column of pixel heating elements, as well as latching the next column of pixel data to be printed. The data processing means is also connected via a gating circuit to the output of printhead for receiving the last column of pixel data after it is shifted out of the printhead and gating that data with the current column of pixel data to generate a set of pixel preheat values. The pixel preheat values generated by the pixel heat system are used to more precisely control the temperature of the individual pixel heating elements by applying the same printing voltage during the pixel preheat portion of a printing cycle as is applied to the actual pixel print portion of a printing cycle, only for a much shorter time period.

Accordingly, a primary objective of the present invention is to provide an improved pixel preheat system for a thermal transfer tape lettering device for transferring characters of a wide variety of type sizes and fonts from a strip of ribbon to a strip of image carrying tape.

Another objective of the present invention is to provide an improved pixel preheat system for an image transfer station that will allow for the more precise control of the pixel heating element temperatures by combining the current pixel print data with the pixel print data to be printed to generate a column of pixel preheat data or values that will be transferred to the printhead prior to the pixel print data.to be printed in order to maintain the temperature of the pixel heating elements just below the threshold temperature for the thermal transfer ribbon.

A further objective of the present invention is to provide an improved pixel preheat system for a thermal transfer tape lettering device that can be implemented without requiring extensive additional circuitry or hardware.

These and other objectives of the present invention will become apparent with reference to the drawings, the detailed description of the preferred embodiment and the appended claims.

DESCRIPTION OF THE PREFERRED EMBODIMENT

Figure 1:
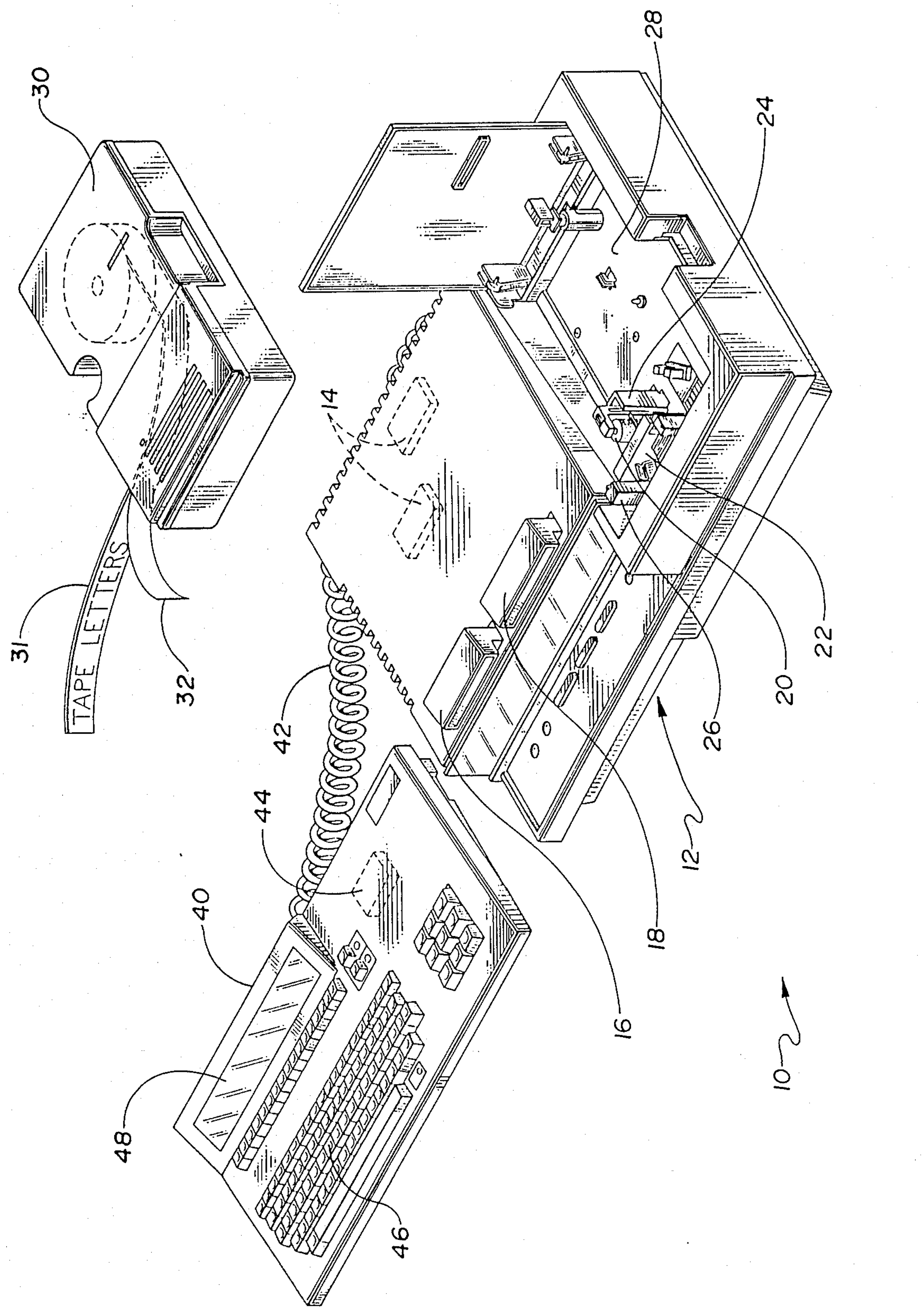
FIG. 1 is an exploded pictorial view of a tape lettering printing apparatus in accordance with the present invention showing a thermal transfer device with associated tape-ribbon cartridge and an input module with an umbilical cord attachment to the thermal transfer device.

Referring to FIG. 1, an exploded pictorial view of a tape lettering or printing apparatus 10 in accordance with the present invention is shown. Although the preferred embodiment is a thermal transfer device, it is contemplated that the features of the present invention are applicable to other similar tape lettering apparatus and strip printers as well. As illustrated in FIG. 1, the operative components of the tape lettering or printing apparatus 10 generally include a thermal transfer device 12 embodying a processing means 14, a pair of font cartridges 16 and 18, a rotary drive means 26 and an image transfer station 20 defined by and disposed between a printhead assembly 22 and a cooperating platen assembly 24. Associated with the transfer device 12 is a movable cartridge service or receiving tray 28 for receiving a tape-ribbon cartridge 30. The cartridge 30 includes a supply of tape and ribbon for providing a tape 31 and a ribbon 32 to the image transfer station 20. The printing apparatus 10 further comprises an input means 40 for entering, editing, storing, manipulating, and/or transmitting input data to the processing means 14 via an umbilical cord interface 42. In the preferred embodiment, the input means 40 comprises a programmable digital microprocessor 44, a keyboard 46 and a display 48. The imput means 40 may also, however, be a digital computer or other device capable of interfacing with the processing means 14 through the interface 42. In the preferred embodiment, the interface 42 is an RS-232-C communication port.

Although the control system has applicability to various lettering apparatus and strip printers, it has particular applicability to a thermal transfer device and associated tape-ribbon cartridge of the type shown and disclosed in co-pending applications entitled TAPE-RIBBON SUPPLY SYSTEM FOR A THERMAL TRANSFER DEVICE OR THE LIKE, Ser. No. 151,103, THERMAL TRANSFER DEVICE AND TAPE-RIBBON CARTRIDGE THEREFOR, Ser. No. 151,110, and THERMAL TRANSFER DEVICE AND TAPE-RIBBON CARTRIDGE EMBODYING A TAPE CUT-OFF MECHANISM, Ser. No. 151,109, all filed on Feb. 1, 1988 and all of which are herein fully incorporated by reference.

Figure 3:
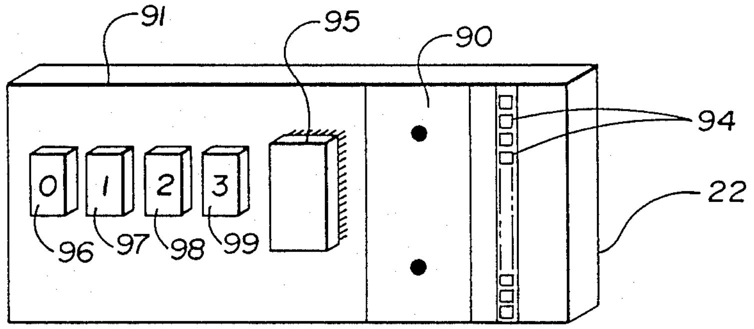
FIG. 3 is a pictorial view of the printhead assembly of the thermal transfer device.

The printhead assembly 22 of the preferred embodiment is illustrated best in FIG. 3. As shown, the printhead assembly 22 comprises a printhead 90 and an associated heat sink 91 mounted to a frame (not shown) for operative alignment with the platen assembly 24. The printhead assembly 22 is electrically connected to the processing means 14 via an appropriate electrical connector. In the preferred embodiment, the printhead 90 is a single column 300 dpi (dots per inch) thin film thermal printhead with associated integrated circuit drivers and which is identified as Model KFT-22-12MPE1-PA available from Kyocera International of Framingham, Mass. The printhead 90 consists of a single column of square heating elements 94, each heating element 94 representing a unique pixel and being electrically connected to a driver circuit 95. The driver circuit 95 electronically controls the head temperature of all of the heating elements 94. The printhead 90 of the preferred embodiment includes 256 heating elements 94 serially driven by four sixty-four bit driver chips illustrated by reference numerals 96, 97, 98 and 99. As will be described further below, the driver circuit 95 receives data from the four driver chips (HIGH to print and LOW to not print) and applies a printing voltage to each of the heating elements 94 to thermally transfer the square area corresponding to that heating element from the thermal ribbon 32 to the image carrying tape 31. A thermal transfer ribbon 32 suitable for use with the preferred embodiment of this invention is Thermal Transfer Ribbon, Model TRX-6-5-4 available from Fuji Kagakusi of Kogyo, Japan. The image carrying tape 31 may be any type of plastic or polymer based film that is capable of receiving a thermal transfer of an image without distoring the substrate or carrier material.

Figure 2:
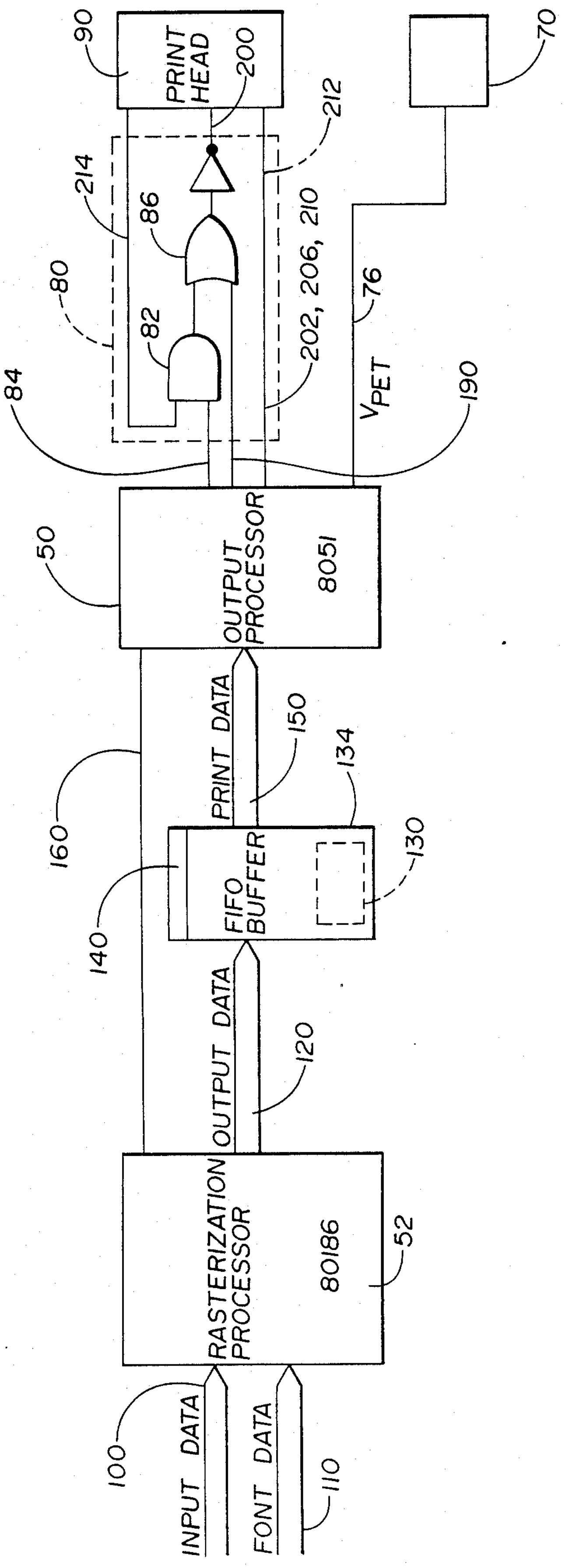
FIG. 2 is a block diagram showing the data flow between the processing means and the printhead of the thermal device of the present invention.

Referring now to FIG. 2, the operation of a preferred embodiment of the control and pixel preheat system of the present invention will be explained. In general, the control and pixel preheat system of the present invention includes a processing means (generally illustrated in FIG. 1 by the reference numeral 14 and more specifically illustrated in FIG. 2 by the reference numerals 50 and 52) for receiving various input data and processing the same to generate data and control signals to drive the printhead assembly 22. More specifically, the processor 52 receives Input Data 100 representing selected characters or designs to be printed and Font Data 110 generally representing a set of character outlines. The processor 52 then processes Input Data 100 and Font Data 110 to generate Output Data 120. The Output Data 120 is in the form of groups of bytes representing single columns of print data with each such group comprising one byte of Control Signals 140 and 32 bytes of Pixel Data 130. The Output Data 120 is provided in parallel form through a FIFO Buffer 134 to the output processor 50 as Print Data 150 in response to an Interrupt Signal 160. Since the FIFO Buffer 134 functions only to store information, the Print Data 150 reflects the same Control Signals 140 and Pixel Data 130 as the Print Data 120. The output processor 50 receives the Output Data 150 comprising Pixel Data 130 and Control Signals 140 and converts the Pixel Data 130 to serial form as represented in FIG. 2 as PRINT DATA IN 190. This data is in the form of a single columnar set of pixel data representing the selected characters to be printed. The processor 50 also supplies Control Signals 140 to the printhead assembly 22 to print the characters represented by Pixel Data 130 on the tape 31.

The combination of features that make up the processing means 50, 52 of the present invention is preferably controlled by a stored software program that operates on the data in the manner described in connection with FIG. 2, although those skilled in the art will recognize that software functions can be accomplished by equivalent hardware. While a pair of microprocessors 50 and 52 are shown as a preferred embodiment of processing means 14, it should also be recognized that the invention could also be achieved through the use of a single microcomputer and associated circuitry, or multiple microcomputers and associated circuitry, or any combination thereof. In the preferred embodiment of the invention, both processors 50 and 52 are programmable digital microprocessors with the output processor 50 being an 8051 microprocessor available from Intel Corporation of Santa Clara, Calif., and the processor 52 being an 80186 rasterization microprocessor, also available from Intel Corporation.

Though in the preferred embodiment of the invention both Control Signals 140 and Pixel Data 130 are generated by a real-time rasterization system based on Input Data 100 representing the desired characters to be printed and Font Data 110 representing the outlines for such characters, it will be apparent to those skilled in the art that Control Signals 140 and Pixel Data 130 may be supplied by any number of methods or in any number of formats without departing from the spirit of the present invention. For example, Pixel Data 130 might be generated from a dot-matrix representation of the selected characters to be printed, instead of being based on an outline representation of the characters; or Pixel Data 130 might be simultaneously transmitted as multiple columns of pixel data, instead of sequentially transmitted as single columns of pixel data. Similarly, Control Signals 140 might be separate control lines connected to the output processor 50, or they might be incorporated as special control codes contained within Pixel Data 130 or Print Data 150.

As described in more detail in co-pending application entitled AN AUTOMATED THERMAL TRANSFER DEVICE AND CONTROL SYSTEM THEREFOR, filed Mar. 21, 1988 and identified by Ser. No. 170,796, which is fully incorporated by reference herein, a preferred embodiment of the present invention includes a means for advancing the tape 31 and ribbon 32 past the transfer station 20 at a constant speed (1 inch/second). As illustrated in the above mentioned co-pending application, detection means is coupled to the rotary drive means 26 for producing a signal $V_{pet}$ 76 that measures the speed and position information of the tape 31 and ribbon 32. $V_{pet}$ 76 is also connected to the output processor 50 for determining when to print the next column of Print Data 150. In the preferred embodiment of the present invention, the output processor 50 uses $V_{pet}$ 76 as a position indicator to identify the current position of the tape 31 and ribbon 32 disposed between the printhead assembly 22 and platen assembly 24. The output processor 50 uses the digital pulses of $V_{pet}$ 76 to directly determine when to print the pixel data as a function of counting a specified number of pulses on $V_{pet}$ 76. When the tape 31 and ribbon 32 are advanced past the transfer station at a rate of 1 inch per second and each column of Print Data 150 is to be printed at 300 pixels per inch, the tape 31 will move one pixel width past the transfer station 20 every 3.3 milliseconds (ms). Accordingly, by using the leading edge of every fourth pulse on $V_{pet}$ 76 (at 1200 Hz), a reference position for the beginning of each column of pixel data is established. The reference position ties the outputting of the Pixel Data 130 directly to the advancement of the tape 31 and ribbon 32 past the transfer station 20 to insure that each succeeding column of Pixel Data 130 will be properly aligned.

Figure 4:
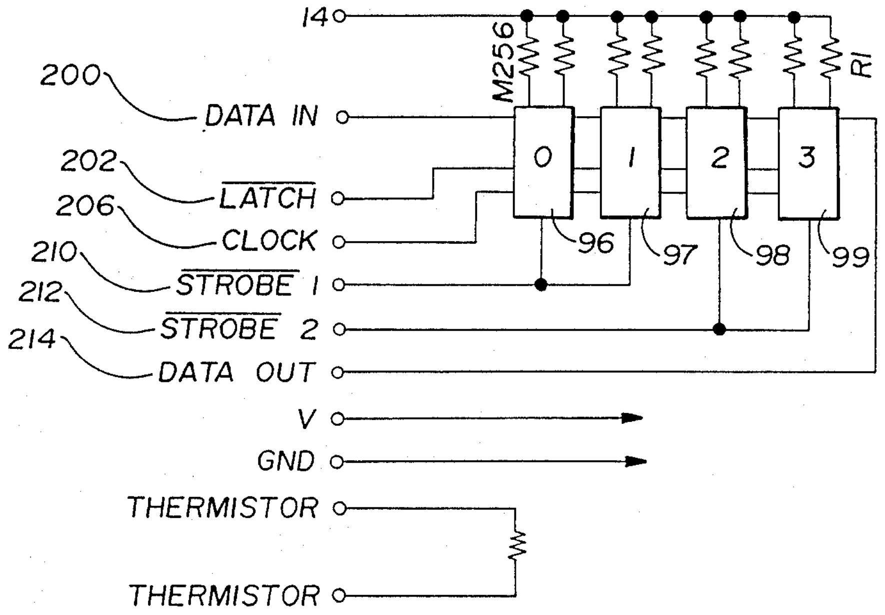
FIG. 4 is a timing diagram of the input and output signals used to drive the printhead of the transfer device.
Figure 5:
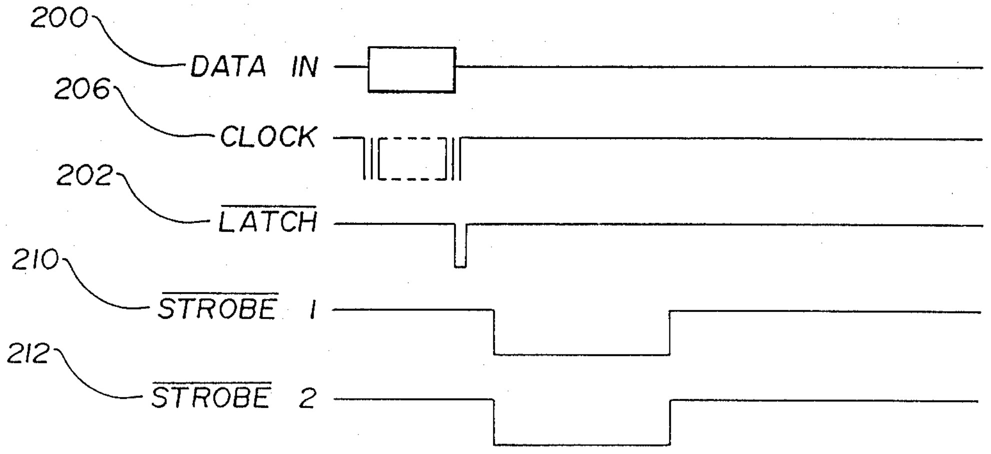
FIG. 5 is a functional schematic diagram of the input and output signals used to drive the printhead of the transfer device.

With specific reference to the timing diagram shown in FIG. 4 and the functional schematic diagram shown in FIG. 5, the outputting of Pixel Data 130 to the printhead 90 will be described. Pixel Data 130 is clocked into the driver chips 96, 97, 98 and 99 by serially placing Pixel Data 130 on DATA IN 200, waiting until CLOCK 206 has clocked all of the pixel data that comprises one column of Pixel Data 130 and then enabling LATCH 202 to latch Pixel Data 130 into the respective driver chips. Pixel data bits 1–64 of Pixel Data 130 are latched into driver chip 99, pixel data bits 65–128 are latched into driver chip 98, pixel data bits 129–192 are latched into driver chip 97, and pixel data bits 193–256 are latched into driver chip 96. The driver chips allow the next column of pixel data to be transferred into the driver chips 96–99 of the printhead 90 while the current column of pixel data is being printed. When Pixel Data 130 has been transferred and latched into the respective driver chips, the output processor 50 enables STROBE 210 and STROBE 212 for a specific time period to apply the heating voltages to the selected heating elements 94. In the preferred embodiment of the present invention, the printhead 90 is equipped with two separate STROBE lines, STROBE 1 (210) and STROBE 2 (212) to allow for the more efficient driving of the driver chips; although in the preferred embodiment STROBE 210 and STROBE 212 are tied together and do not operate independently of one another. STROBE 210 and STROBE 212 activate the driver circuit 95 to apply a specific heating voltage to each of the heating elements 94 in the printhead 90 for a predetermined time period. For the particular printhead and tape of the preferred embodiment, STROBE 210 and STROBE 212 are activated for a fixed time period of 1.4 ms to achieve the optimum print quality.

As Pixel Data 130 is being strobed into driver chips 96, 97, 98, and 99, output processor 50 also signals rasterization processor 52 by means of Interrupt Signal 160 that another column of Pixel Data 130 may be loaded into FIFO Buffer 134. Pixel Data 130 is stored in FIFO Buffer 134 along with the Control Signals 140.

Figure 6:
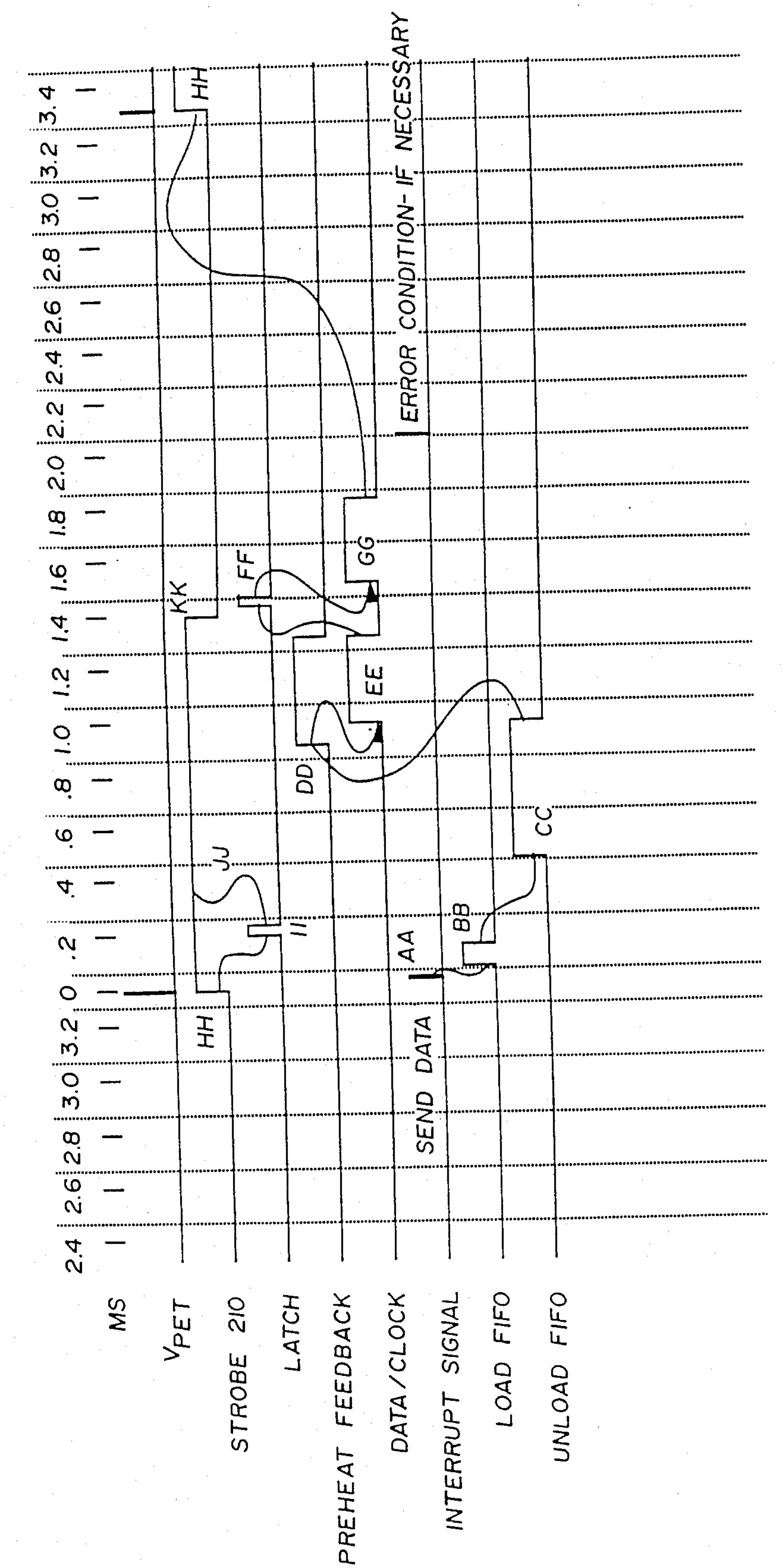
FIG. 6 is a timing diagram of the overall data flow as controlled by the processing means of the present invention.

In a preferred embodiment of the present invention, each of the heating elements 94 is preheated with a unique pixel preheat data value. The pixel preheat values for the next column of pixels to be printed is determined by consideration of the value of the next pixel to be printed and the value of the current pixel being printed. Because the preferred embodiment of the driver circuit 96 is provided with DATA OUT 214, the output processor 50 can make use of the past pixel data values as they are being shifted out of the driver circuit 95 to calculate the pixel preheat values for the next column of pixel data. Gating circuit 80 accomplishes this by enabling the gating circuit 80 during the pixel preheat value transfer interval (at GG as shown in FIG. 6). As shown in FIG. 2, AND gate 82 is connected to DATA OUT 214 from the printhead 90 and to ENABLE PREHEAT 84 from the output processor 50. The output of AND gate 82 drives OR gate 86 that is also connected to PRINT DATA IN 190 from the output processor 50. PRINT DATA IN 190 represents the Pixel Data 130 in complimented or inverted form. The output of OR gate 86 is inverted and supplied via DATA OUT 200 to the driver chips 96, 97, 98, and 99 to generate the pixel preheat values for the next column of Pixel Data 130. The logic table for gating circuit 80 is as follows:

TABLE 1

| ENABLE PREHEAT | PRINT DATA IN | DATA OUT | DATA IN |
|---|---|---|---|
| "1" | "0" | "0" | "1" |
| "1" | "0" | "1" | "0" |
| "1" | "1" | "0" | "1" |
| "1" | "1" | "1" | "1" |
| "0" | "0" | "X" | "1" |
| "0" | "1" | "X" | "0" |

Having described the operation of the elements of the output processor 50 and the printhead assembly 22, the overall timing and data flow can best be understood by reference to FIG. 6. The timing sequence and data flow is shown for the transfer of a single column of Pixel Data 130 from the rasterization processor 52 to the output processor 50, and then to the printhead 90 to be printed, and finally back to the output processor 50 to be used in calculating the pixel preheat values for the next column of Pixel Data 130. This entire process is completed once every 3.3 ms to print each column of Pixel Data 130 on the tape 31 at an effective rate of 1 inch per second. $V_{pet}$ 76 defines the duration of each cycle, with the leading edge of every fourth pulse indicating the start of a new column to be printed. At AA of FIG. 6, the output processor 52 raises Interrupt Signal 160 to tell the rasterization processor 52 to load FIFO Buffer 134 with a new column of data which occurs at BB. At CC, the output processor 50 unloads Print Data 150 from FIFO Buffer 134 and examines the control byte for a control code. If the data in FIFO Buffer 134 is pixel data to be printed, the output processor 50 sets up PRINT DATA IN 190 to be combined with the pixel data currently in the printhead 90 and shifted out beginning at DD to generate the pixel preheat values. At EE, the pixel preheat values for Print Data 150 are strobed into the driver chips 96, 97, 98, and 99 and subsequently latch at FF. At GG, the actual pixel values for Print Data 150 are strobed into the driver chips 96, 97, 98, and 99 and will remain ready to be latched into the printhead elements 94 at the beginning of the next print cycle. From GG to HH, the printhead elements 94 are on the cool-down phase of their heating cycle from the previous print cycle and by HH all of the heating elements 94 should have returned to a temperature just below the threshold transfer temperature of the thermal ribbon 32. At HH, STROBE 210 and STROBE 212 are activated for 1.4 ms and the printing voltage is applied to the pixel values for each of the heating elements 94, which at HH will be the pixel preheat values that were latched at FF. As will be seen at II, the pixel preheat voltages are applied, after which LATCH 206 is enabled and the actual pixel values for Print Data 150 are provided to the heating elements 94. The actual preheat time is determined empirically and depends on the particular tape and ribbon formulation, among other possible factors. Normally this period ranges from about 25 to 150 microseconds. The printing voltage is applied for the duration of the 1.4 ms period until KK, when it is removed and the temperature of the heating elements is allowed to return to just below the threshold temperature for those pixels which were turned on.

Figure 7:
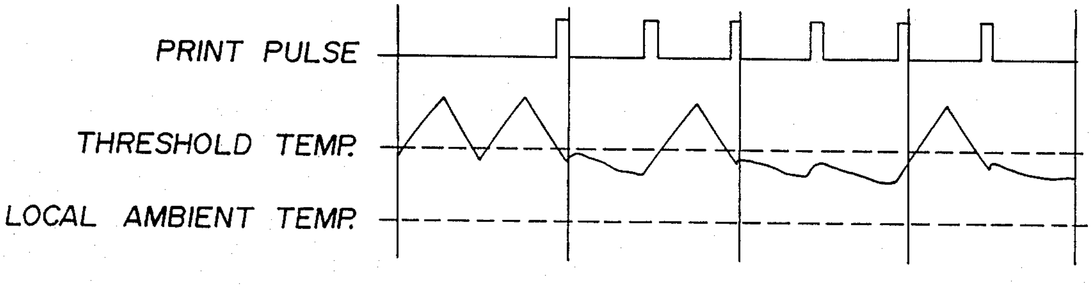
FIG. 7 is an illustration of the manner in which the present invention controls the preheating of the pixel elements of printhead of a thermal transfer device.
Figure 8:
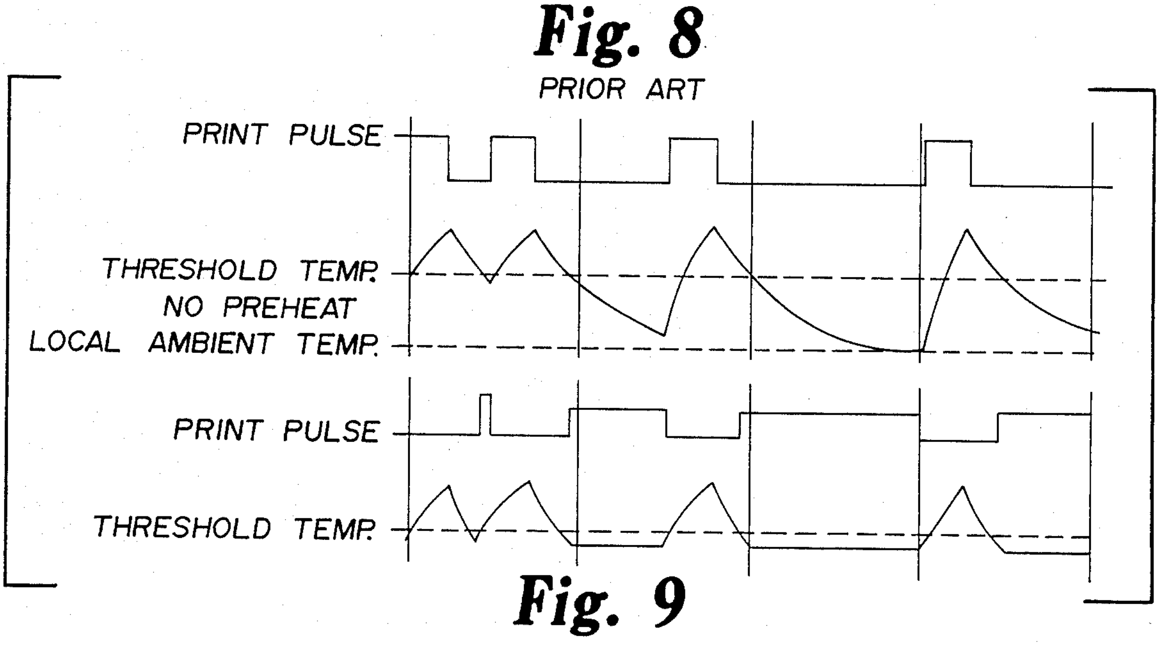
Fig. 8 PRIOR ART
FIGS. 8–10 are illustrations of the manner in which prior art devices controlled the preheating of the pixel elements of printhead of a thermal transfer device.
Figure 9:
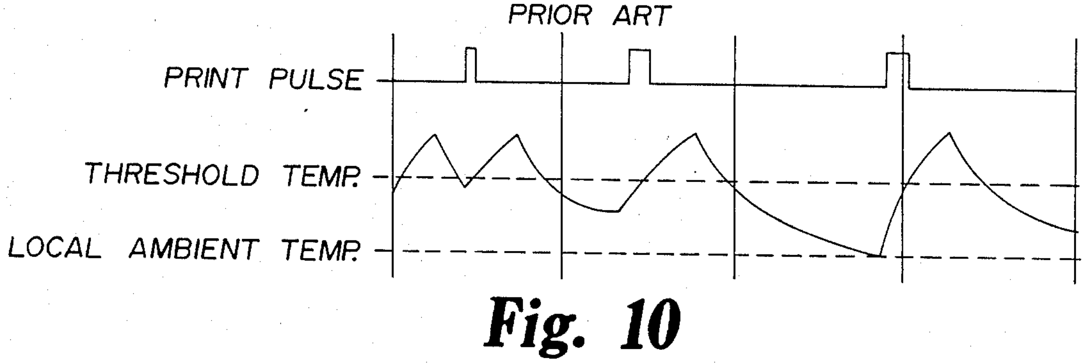
Fig. 9 PRIOR ART
Figure 10:
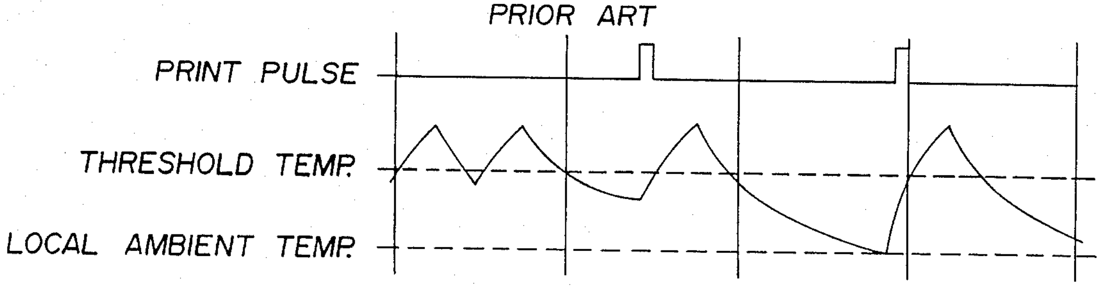
Fig. 10 PRIOR ART

The net effect of the pixel preheat system of the present invention can best be seen in the comparison of the operational effects of the present invention, as shown in FIG. 7, with the operational effect of three prior art pixel preheat systems, as shown in FIGS. 8–10. It is apparent that by using the pixel preheat system of the present invention, the temperature of the individual heating elements 94 is maintained in a closer relationship to the transition temperature of the thermal transfer tape 32. In addition, there is significantly less deviation between the average temperature of the heating elements 94 and the transition temperature than in the prior art devices, because the pixel preheat pulses are applied in a more consistent manner. This results in a more consistent transfer of the pixel images from the ribbon 32 to the tape 31, both in terms of the time to activate the heating element 94 and the initial temperature and final temperature that will be achieved by the heating element as a result of the application of the printing voltage.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A pixel preheat system for an automated thermal transfer device having an image transfer station comprising a thermal printhead in operative association with a color carrying ribbon and an image carrying tape for transferring a selected image comprised of a set of columns of pixel data from said ribbon to said tape, said thermal printhead having at least one column of pixel heating elements, comprising:

latch means for storing a first column of the pixel data and for shifting out the pixel data after it has been printed by said thermal printhead;

driver means operably connected to said latch means for applying a specified heating voltage to said pixel heating elements in response to the respective pixel data stored in said latch means;

gating means operably connected to said latch means for receiving the pixel data as it is shifted out of said latch means and for combining the shifted out pixel data with a second column of pixel data to generate a column of pixel preheat data associated with the second column of pixel data; and processing means operably connected to said gating means, said latch means, said driver means and said thermal printhead for transferring the first column of pixel data to said latch means, supplying a strobe signal to said driver means to cause the respective pixel data stored in said latch means to be printed, enabling said gating means to shift out the first column of pixel data and combine the first column of pixel data with the second column of pixel data to generate the column of pixel preheat data, transferring the column of pixel preheat data to said latch means and supplying a strobe signal to said driver means to cause the preheating of said pixel heating elements for the second column of pixel data, whereby the temperature of said pixel heating elements is maintained just below a threshold transfer temperature of said ribbon.

2. The pixel preheat system of claim 1 wherein said gating means NAND's the shifted out pixel data with the second column of pixel data to generate the column of pixel preheat data.

3. A pixel preheat system for an automated thermal printhead for transferring a selected image comprising:

an image transfer station including a thermal printhead in operative association with a thermal ink ribbon means having a threshold temperature and an ink receiving tape means for transferring said selected image from said ribbon means to said tape means, said printhead having at least one column of pixel heating elements;

pixel data means for providing said image to be printed, said image being comprised of a plurality of columns of pixel data;

pixel data latch means for storing a first column of said pixel data and for shifting out said column of pixel data after it has been printed by said printhead;

processor means for transferring said column of pixel data from said pixel data means of said latch means;

strobe means for operating a printhead control signal;

driver means for applying a specified heating voltage to said pixel heating elements in response to said pixel data stored in said latch means and said printhead control signal;

gating means operably connected to said latch means for receiving said pixel data as it is shifted out of said latch means and for combining the shifted out pixel data with a second column of pixel data from said pixel data means to generate a column of pixel preheat data to maintain the temperature of said pixel heating elements below the threshold transfer temperature of said ink ribbon means.

4. The pixel preheat system of claim 3 wherein said gating means NAND's the shifted out pixel data with the second column of pixel data to generate the column of pixel preheat data.

5. A pixel preheat system for maintaining the temperature of pixel heating elements of a thermal transfer printhead means close to, but just below, a theshold transfer temperature for a ribbon means used in operative association with the printhead means to print a selected image on an image carrying means, the selected image being represented by print data comprised of a plurality of columns of pixel data, the pixel preheat system comprising:

means for storing a first column of pixel data to be printed by the printhead means;

means operably connected to the means for storing the pixel data and the printhead means for applying a specified printing voltage for a specified printing time to the pixel heating elements to cause the pixel heating elements to print the respective pixel data stored in the means for storing pixel data;

means operably connected to the means for storing the pixel data for receiving the first column of pixel data after it is printed by the printhead means and for combining the first column of pixel data with a second column of pixel data to generate a column of pixel preheat data associated with the second column of pixel data; and means operably connected to the means for generating the column of pixel preheat data and the printhead means for applying the specified printing voltage to the pixel heating elements for a time period shorter than the specified printing time to cause the column of pixel preheat data to preheat the respective pixel heating elements associated with the second column of pixel data to maintain the temperature of said pixel heating elements just below the threshold transfer temperature for the ribbon means.

6. The pixel preheat system of claim 5 wherein the means for generating the column of pixel preheat data generates the column of pixel preheat data in accordance with the following logic table:

| First Column | Second Column | Preheat Column |
|---|---|---|
| "0" | "0" | "1" |
| "1" | "0" | "0" |
| "0" | "1" | "1" |
| "1" | "1" | "1" |

7. A pixel preheat system for a printing apparatus comprised of a thermal printhead means in combination with an transfer ribbon means and an image carrying means, the thermal printhead having at least one column of pixel heating elements, comprising:

processor means for receiving print data representing a selected image to be printed by the printing apparatus, the print data comprising a plurality of columns of pixel data, and for providing a column of pixel data and a print strobe signal and a preheat strobe signal to the printhead means;

latch means operably connected to the printhead means and the processor means for receiving the column of pixel data to be printed by the printhead means and for shifting out the column of pixel data after the print strobe signal is received by the printhead means;

gating means operably connected to the processor means and the latch means for receiving the shifted out column of pixel data and a second column of pixel data and generating a column of pixel preheat data in response to a preheat enable signal generated by the processor means, the column of pixel preheat data to be received by the latch means and used to preheat the printhead means in response to the preheat strobe signal from the processor means, whereby the pixel heating elements of the printhead means are substantially maintained at temperature nominally below a threshold transfer temperature of the ribbon means.

8. The pixel preheat system of claim 7 wherein the columns of print pixel data and preheat pixel data are generated and received one pixel at a time are printed one column at a time.

9. A method for preheating a column of pixel heating elements in a thermal printhead of an automated thermal transfer device having an image transfer station comprising the thermal printhead in operative association with a color carrying ribbon and an image carrying tape for transferring a selected image comprised of a set of columns of pixel data from the ribbon to the tape, comprising the steps of:

storing a first column of the pixel data to be printed by the thermal printhead;

printing the first column of pixel data by applying a specified heating voltage to the pixel heating elements for a predetermined print time;

shifting out the pixel data after it has been printed by the thermal printhead;

combining the shifted out pixel data with a second column of pixel data to generate a column of pixel preheat data associated with the second column of pixel data;

storing the column of pixel preheat data to be used by the thermal printhead; and preheating the column of pixel preheat data by applying the specified heating voltage to the pixel heating elements for a predetermined preheat time thereby causing the preheating of the pixel heating elements for the second column of pixel data, whereby the temperature of said pixel heating elements is maintained just below a threshold transfer temperature of the ribbon

10. The method of claim 9 wherein the step of combining the shifted out pixel data with a second column of pixel data is accomplished by NANDing the shifted out pixel data with the second column of pixel data.

11. A method of preheating pixel heating elements of a thermal transfer printhead means to maintain the temperature of the pixel heating elements close to, but just below, a threshold transfer temperature for a ribbon means used in operative association with the printhead means to print a selected image on an image carrying means, the selected image being represented by print data comprised of a plurality of columns of pixel data, comprising the steps of:

storing a first column of pixel data to be printed by the printhead means;

applying a specified printing voltage for a specified printing time to the pixel heating elements to cause the pixel heating elements to print the respective pixel data for the first column of pixel data;

receiving the first column of pixel data after it is printed by the printhead means and combining the first column of pixel data with a second column of pixel data to generate a column of pixel preheat data; and applying the specified printing voltage to the pixel heating elements for a time period shorter than the specified printing time to cause the column of pixel preheat data to preheat the respective pixel heating elements associated with the second column of pixel data to maintain the temperature of said pixel heating elements just below the threshold transfer temperature for the ribbon means.

12. The method of claim 11 wherein the step of receiving the first column of pixel data after it is printed by the printhead means and combining the first column of pixel data with a second column of pixel data generates the column of pixel preheat data in accordance with the following logic table;

| First Column | Second Column | Preheat Column |
|---|---|---|
| "0" | "0" | "1" |
| "1" | "0" | "0" |
| "0" | "1" | "1" |
| "1" | "1" | "1" |

13. The method of claim 11 wherein the columns of print pixel data and preheat pixel data are generated and received one pixel at a time and are printed one column at a time.

* * * * *

UNITED STATES PATENT AND TRADEMARK OFFICE

CERTIFICATE OF CORRECTION

PATENT NO. : 4,859,093

DATED : August 22, 1989

INVENTOR(S) : Michael A. Plotnick

It is certified that error appears in the above-identified patent and that said Letters Patent is hereby corrected as shown below:

Column 1, line 56 delete "2,834,507 and insert -- 3,834,507 -- therefor.

Signed and Sealed this

Twenty-third Day of October, 1990

Attest:

HARRY F. MANBECK, JR.

*Attesting Officer*

*Commissioner of Patents and Trademarks*